June 19, 1928.  
F. P. AHMAN  
1,673,963  
AUTOMOBILE BACKSTOP  
Filed Aug. 9, 1927  
2 Sheets-Sheet 1
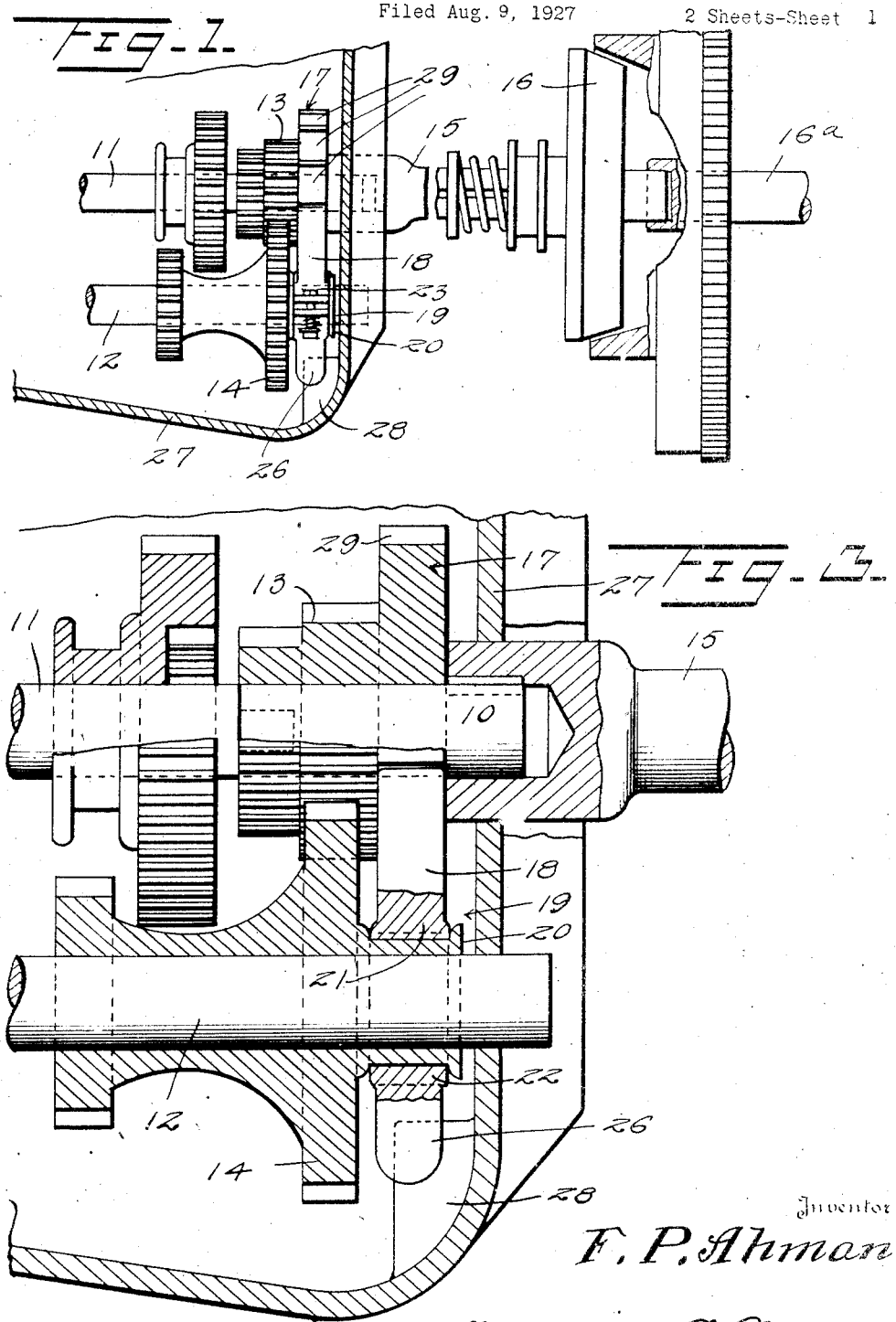
Inventor  
F. P. Ahman  
By Watson E. Coleman  
Attorney

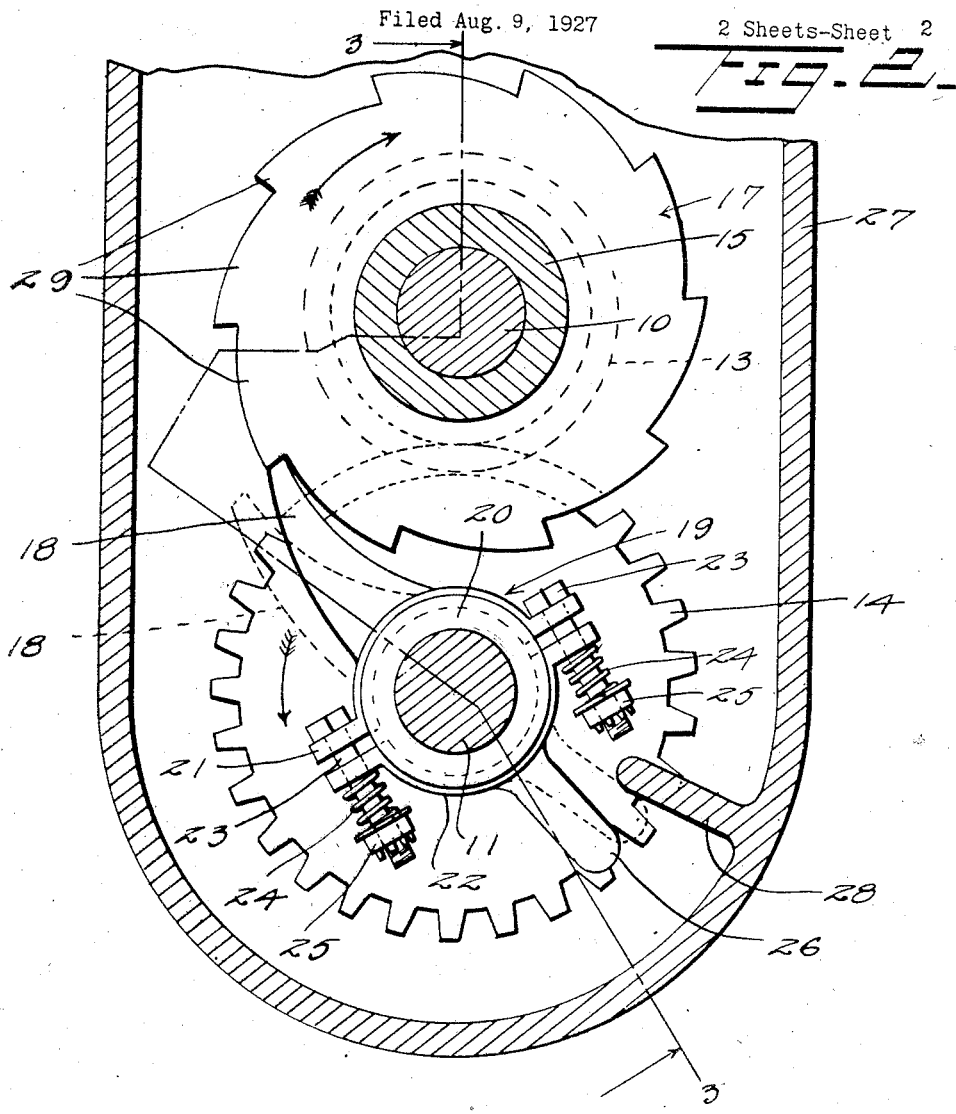

Patented June 19, 1928.

1,673,963

UNITED STATES PATENT OFFICE.

FRANK F. AHMAN, OF NORFOLK, VIRGINIA.

AUTOMOBILE BACKSTOP.

Application filed August 9, 1927. Serial No. 211,786.

This invention relates to transmissions and more particularly to the construction of an ordinary gear transmission to enable use thereof for locking a vehicle in which it is employed against drifting movements in either direction as selected.

A further object of the invention is to produce a device of this character which will additionally prevent reverse or "kicking" movements of the engine shaft of the vehicle with which it is employed.

A still further object of the invention is to produce a device of this character which may be readily embodied in standard transmission constructions without materially altering the present construction thereof.

Further object of the invention is to produce a device of this character which is noiseless in its operation and which will be durable and efficient in service.

These and other objects I attain by the construction shown in the accompanying drawings, wherein for the purpose of illustration is shown a preferred embodiment of my invention and wherein:—

Figure 1 is a vertical sectional view showing apparatus constructed in accordance with my invention applied to a transmission;

Figure 2 is a vertical sectional view through the transmission;

Figure 3 is a section on the line 3—3 of Figure 2.

Referring now more particularly to the drawings, the numerals 10, 11 and 12 designates respectively, the input, output and counter-shaft of an ordinary gear transmission. As is well known to those familiar with the art, the input shaft transmits its energy to the counter-shaft 12 through gears 13 and 14 and this power is transmitted to the output shaft by shiftable gearing including reverse gearing, by means of which the direction of rotation of the output shaft is reversed from that in which it is ordinarily driven. It will be obvious that if the shaft 11 is connected for reverse movement and the car tends to move "forwardly", the normal direction or rotation of the shaft 12 will be reversed and this will tend to reverse the normal direction of movement of the gear 13 of the input shaft and through this shaft the direction of rotation of the clutch shaft 15 with which the shaft 10 is connected. Since the direction of rotation of the shafts 10 and 12 is normally constant and opposed, it will be obvious that any means preventing rotation of these shafts in the opposite direction will, if the gearing is arranged to connect the shafts 11 and 12 so that the shaft 11 is driven "forwardly", prevent driving of the shaft 11 rearwardly and if the shaft 11 is connected to drive rearwardly, will prevent driving of this shaft "forwardly". It will also be obvious that if the clutch elements, generally designated at 16 and employed to connect the clutch shaft 15 with the engine shaft 16ª, are engaged, this same means will serve to prevent reverse rotation of the engine shaft.

In accordance with my invention, I secure against rotation with relation to one of the shafts 12 and 10 a ratchet disk 17, this disk being shown in the present instance as secured to the gear 13 which is fast to the shaft 10. Upon the other of the shafts, I rotatably mount a pawl 18 for coaction with the ratchet disk 17 and provide this pawl with friction brake mechanism, generally designated at 19, whereby the pawl may be operatively engaged with the shaft 12, so that it will tend to rotate in the same direction therewith. In the present instance, the gear 14 is shown as provided with a grooved hub 20, within the groove of which are disposed the sections 21 and 22 of a split and eared collar. Through the ears of the sections are loosely extended securing bolts 23, which provide mountings for springs 24 surrounding the bolts between the ears of one of the sections and nuts 25 mounted on the bolts, so that the sections will be constantly urged toward one another to frictionally grip the base of the groove. The section 21 has the pawl 18 secured thereto, while the section 22 has a lug 26 projecting outwardly therefrom. The transmission casing 27 is provided with a stop 28 against which this lug will engage when the collar 19 has rotated a distance sufficient to properly disengage the pawl 18 from the teeth 29 of the ratchet, so as to prevent too great a separation of the pawl and ratchet.

It will be obvious that when the shafts are rotating in their normal directions, which are indicated by the arrows of Figure 2, the frictional grip of the collar 19 upon the hub will cause the pawl to be disengaged from the ratchet, so that there is no noise in operation. When, however, the direction of rotation is reversed, this frictional grip will cause the pawl to move toward the ratchet disk 17 and to engage against a tooth 29 thereof, holding the shaft 10 against rotation in this direction. It will be obvious that if the shafts 10, 11 and 12 are at this time interconnected by gearing, rotation of all of these shafts will be checked and in any event, rotation of the shafts 10 and 12 which are permanently connected in this direction will be prevented. Since the shaft 10 is permanently connected with the shaft 15, it will be obvious that if the clutch sections 16 are engaged, the engine shaft 16ᵃ will be likewise held against reverse rotation, thus preventing "kick-back" during cranking operations, where the car is so positioned that the gears may be placed in "neutral" and the clutch sections engaged.

From the foregoing, it will also be obvious that with a structure of this character, if the car is in such position that it would incline to drift "forwardly," this driving movement can be prevented by placing the car in reverse gear, with the result that the back wheels are locked and the drifting movement checked. If the car inclines to drift rearwardly, the transmission may be placed in forward gear and the wheels locked in this manner.

Since the construction hereinbefore set forth is capable of a certain range of change and modification without materially departing from the spirit of the invention, I do not limit myself to such specific structure except as hereinafter claimed.

I claim:—

1. In combination with a transmission embodying the usual oppositely rotating input and counter shafts, a ratchet disk secured to one thereof, a pawl for coaction therewith and a mounting for the pawl upon the other of the shafts whereby the pawl is moved into engagement with the ratchet disk upon reversal of the normal rotation of said shafts.

2. In combination with a transmission embodying the usual oppositely rotating input and counter shafts, a ratchet disk secured to one thereof, a pawl for coaction therewith having a mounting frictionally engaged with the other shaft and means positively limiting rotation of the mounting in a direction separating the pawl from the ratchet disk.

3. In combination with a transmission embodying the usual oppositely rotating input and counter shafts, a ratchet disk secured to one thereof, a pawl for coaction therewith, a sectional collar upon one section of which the pawl is mounted surrounding the other shaft and means resiliently urging the sections of the collar into operative engagement with the shaft.

4. In combination with a transmission embodying the usual oppositely rotating input and counter shafts, a ratchet disk secured to one thereof, a pawl for coaction therewith, a sectional collar upon one section of which the pawl is mounted surrounding the other shaft, connections between the sections permitting relative movement thereof and springs urging said sections into engagement with the shaft.

5. In combination with a transmission embodying the usual oppositely rotating input and counter shafts, a ratchet disk secured to one thereof, a pawl for coaction therewith, a sectional collar upon one section of which the pawl is mounted surrounding the other shaft, means resiliently urging the sections of the collar into operative engagement with the shaft, a lug carried by said collar and a fixed stop with which the lug engages when the collar has rotated a predetermined distance in a direction separating the pawl from the disk.

6. In combination with a transmission embodying the usual oppositely rotating input and counter shafts, a ratchet disk secured to one thereof, a pawl for coaction therewith, a sectional collar upon one section of which the pawl is mounted surrounding the other shaft, means resiliently urging the sections of the collar into operative engagement with the shaft, and means positively limiting rotation of the collar after a predetermined movement thereof in a direction separating the pawl from the ratchet disk.

In testimony whereof I hereunto affix my signature.

FRANK P. AHMAN.